Patented May 17, 1949

2,470,451

UNITED STATES PATENT OFFICE 2,470,451

PHOSPHORS

Elton J. Wood, Hopewell, N. J., assignor to Radio Corporation of America, a corporation of Delaware No Drawing. Application October 17, 1945, Serial No. 622,947

2 Claims. (Cl. 252—301.6)

A large number of phosphors have the ability to store up energy after excitation and release it after the excitation ceases. This subsequent release of energy is known as phosphorescence. The greater number of these phosphors release the energy spontaneously and a lesser number of them release the energy in visible amount only when stimulated by another energy, such as infra-red radiation.

It is an object of this invention to provide a phosphor that stores energy after excitation and releases it in a more efficient manner by infra-red radiation.

Another object of the invention is to provide a phosphor that stores energy and releases it upon stimulation by long infra-red radiation of the order of 13,000 Å.

Other objects will appear in the following description.

In my improvement, the phosphor consists of zinc sulphide activated by copper, manganese and terbium. A typical example of the preparation of the composition is 100 grams of zinc sulphide, 0.001 gram of copper, 0.05 gram of manganese and 0.02 gram of terbium, mixed with 5 grams of sodium chloride as a flux. The mixture is heated in an inert or slightly reducing atmosphere for 20 to 60 minutes at a temperature of from 1150° C. to 1250° C. to crystallize the material. After cooling, the crystallized product is reduced to adequate fineness and applied in any of the known ways to a suitable backing for various uses in signaling, photo recording and others, the particular form of which is not part of this invention. It may be said, however, that the phosphor may be excited by blue light, ultra-violet, cathode rays, etc., at appropriate times. Infra-red rays may then be directed onto the phosphor thus previously excited and cause it to emit light, which may be used in various known ways.

It is of interest to note that by projecting the infra-red rays onto the previously excited phosphor screen through a picture film, the phosphor will luminesce in reverse manner. That is, if a negative picture film is used in this way, a positive will be produced by the phosphor, and vice versa.

Cadmium sulphide may be substituted for part of the zinc sulphide to obtain variations in color of fluorescence and phosphorescence, as well as the intensity of phosphorescence.

Zinc sulphide phosphor, as described, luminesces after excitation in the yellow to green region of the spectrum and it may be shifted toward the red spectrum by substituting cadmium sulphide for part of the zinc sulphide. These same properties may also be altered by varying the amounts of copper and manganese and the ratio of copper to manganese. Either of these activators may be present from 0% up to 1% by total weight of the sulphide.

The concentration of the terbium for optimum stimulation by infra-red radiation is dependent upon the properties of the other constituents, but in general may be used within the range of 0.01% to 0.02% by weight of the sulphide. The three activators mentioned may be incorporated in the mixture as any suitable compounds, but the percentages mentioned are based on the metal content of such compounds.

While sodium chloride is given as the flux, of course other fluxes may be used, such as the halides of the alkali metals or the alkali earth elements, either singly or in combination. The choice in this respect is governed by the required physical characteristics of the phosphor.

Crystallization procedure for the mixed materials depends upon specific circumstances, but as a general rule it may be stated that temperatures must be such as to convert substantially all the sulphide to the Wurzite form. This is usually within the range 1000° C. to 1400° C.

An important property of my improved phosphor is that it is particularly sensitive to stimulation by long infra-red radiations, that is, radiation of the order of 13,000 Å., and the energy may be stored for a long period of time. In particular cases I have obtained good luminescence from a previously excited phosphor as long as 60 hours after discontinuation of the excitation.

Having described my invention, what I claim is:

1. A phosphor material consisting essentially of crystallized zinc sulphide and activators of copper, manganese and terbium, the copper and manganese being up to 1% of the weight of the sulphide and the terbium being from 0.01% up to 0.02% of the weight of said sulphide.

2. A phosphor material consisting of 100 parts of zinc sulphide crystallized with activators of 0.001 part copper, 0.05 part manganese and 0.02 part terbium, said parts being by weight.

ELTON J. WOOD.

REFERENCES CITED

The following references are of record in the file of this patent:

UNITED STATES PATENTS

| Number | Name | Date |
|---|---|---|
| 2,049,765 | Fischer | Aug. 4, 1935 |
| 2,075,399 | Levy | Mar. 30, 1937 |
| 2,396,927 | Swanson | Mar. 12, 1946 |

FOREIGN PATENTS

| Number | Country | Date |
|---|---|---|
| 453,927 | Great Britain | June 13, 1935 |

OTHER REFERENCES

Fonda, "Factors Affecting Phosphorescence Decay of the Zinc Sulfide Phosphors," preprint 87–7, by Electro-Chemical Society, April 16, 1945, pages 78, 79.